United States Patent [19]

Douros, Jr. et al.

[11] 3,725,557
[45] Apr. 3, 1973

[54] ALLOXANTIN COMPOUNDS AS ANTIBACTERIAL AND ANTIFUNGAL AGENTS

[75] Inventors: John D. Douros, Jr.; Al Fred Kerst, both of Littleton, Colo.

[73] Assignee: The Gates Rubber Company, Denver, Colo.

[22] Filed: Aug. 14, 1970

[21] Appl. No.: 75,312

[52] U.S. Cl. .....................424/251, 71/92, 260/45.75
[51] Int. Cl. ...........................A01n 9/00, A01n 9/22
[58] Field of Search.......................................424/251

[56] References Cited

OTHER PUBLICATIONS

Herbert et al., Endocrinology 35: 391 (1944).

Bruckmann et al., J. Biol. Chem. 168, 241 (1947).

*Primary Examiner*—Albert T. Meyers
*Assistant Examiner*—Allen J. Robinson
*Attorney*—Raymond Fink, H. W. Oberg, Jr. and Curtis H. Castleman, Jr.

[57] ABSTRACT

Alloxantin, and alloxantin dihydrate can be used to inhibit and/or prevent the growth of undesirable herbs, bacteria, fungi, and other microorganisms. This invention is particularly concerned with the bacteriostatic and bactericidal properties of alloxantin compounds against *Staphylococcus aureus* and *Xanthomonas phaseoli*.

12 Claims, No Drawings

ALLOXANTIN COMPOUNDS AS ANTIBACTERIAL AND ANTIFUNGAL AGENTS

BACKGROUND OF THE INVENTION

The present invention relates to the use of compounds of alloxantin,

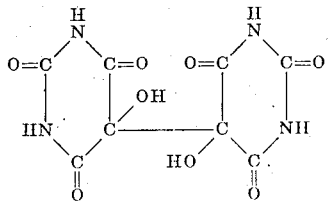

for killing or inhibiting the growth of undesirable herbs, bacteria, yeast, and fungi. The chemical literature reveals few subjects, even within the rapidly expanding discipline of biochemistry, which have generated so many patent applications as the areas involving the biochemical uses of compounds which contain the barbituric acid nucleus

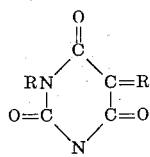

where R represents various substituents. Representative biochemical uses of such compounds are found in U.S. Pat. Nos. 2,561,688; 2,605,209; 2,725,380; 2,820,035; 2,887,487 and 3,102,072. However, the biological activity of compounds of alloxantin have not been previously discovered.

The wide range of biological activity exhibited by the alloxantin compounds of this invention means that such compounds can be used in various phases of agriculture. However, the chemical arts must also consider the general principles governing the formulation, method of application, metabolism, and potential toxic hazards of such microorganism-inhibiting compounds along with their chemical structures and reactions. The alloxantin and alloxantin dihydrate of the present invention are no exception. The applicants specifically urge consideration of the biological considerations associated with the use of alloxantin compounds given by researchers such as: Herbert P.A., Koref, O., Vargos, L., Rodriguez, F.H., and Telchi, A., Endocrinology 35: 391 (1944).

SUMMARY OF THE INVENTION

According to the present invention, it has been found that the alloxantin compounds:

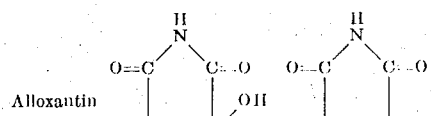

and

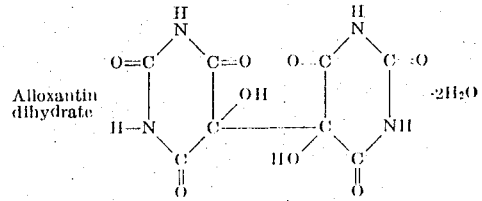

when present in effective quantities are very active bactericidal, herbicidal, and fungicidal agents. References concerning the structure and synthetic procedures associated with alloxantin are given by: Singh, C., *The Structure of the Pyrimidines and Purines*, IX. *The Crystal Structure of Alloxantin Dihydrate*, Acta Cryst. 19,767, (1965); Moehlau, R., and Litter, H., *Ueber die Einwirkung primaerer Amine auf Alloxantin*, J. fuer Praktische Chemie 73, 472 (1906).

The alloxantin compounds of this invention were prepared in the following manner: A 12-litter flask was equipped with an overhead stirrer and immersed in a cold water vessel. To the reaction vessel was added 3.2 liters of water, 1.6 liters of hydrochloric acid and 1 kilogram of uric acid. To this cooled solution was added 400 grams of potassium chlorate at a rate which kept the mixture at 35° C. This final clear solution was then outgassed with air and cooled to 0° C. in a salt ice bath. This solution was stirred while a stannous chloride solution, consisting of 625 grams of stannous chloride dissolved in 960 ml. of 50 percent hydrochloric acid, was added slowly over a 30-minute period. The final solution was stirred 30 minutes at 5° C., and the precipitate was collected by filtrations, washed with ice water and dried. The final product, alloxantin dihydrate, was characterized by its decomposition point (228° to 230° C.), infrared spectrum and nitrogen analysis. The anhydrous material was produced by drying the alloxantin dihydrate in vacuum at 5mm. pressure and 185°C.

In their antibacterial aspects, the applicants have found that the alloxantin compounds of this invention, when present in effective quantities, act as bactericides toward a wide variety of Gram positive bacteria. The in vitro effectiveness of alloxantin compounds against such bacteria was established under the following test conditions:

One loopful of each of the investigated bacteria was transferred from agar slants to 10 ml. of trypticase soybroth and incubated at 37° for 18 hours. At the end of this time, the bacteria were seeded into the same medium (+2 percent agar) in which the original inoculum was prepared. The bacteria were then seeded at 1 ml. of inoculum per 250 ml. of medium which were equivalent to at least $1 \times 10^6$ cells/ml. determined by dilution plate count nephelometer readings. The resulting mixture was poured into a heat resistant sterile petri dish at a temperature of 45° C. Analytical filter paper discs of ½ inch diameter were used for the agar diffusion technique. Each disc was saturated with 0.08 ml. of the solublized alloxantin test compound at 100 ug./disc, and placed on the surface of the hardened agar. The plates were incubated at 37° C. for 18 hours. The activity of the alloxantin compounds was established by measuring the zone of inhibition in centimeters. Untreated control plates were used as a basis for comparison and these exhibited a profuse growth of bacteria. The following results were noted:

| Gram Positive Bacteria | Zone of inhibition in centimeters for alloxantin | Zone of Inhibition in centimeters for alloxantin Dihydrate |
|---|---|---|
| Staphylococcus aureus ATCC No. 209P | 1.8 | 1.7 |
| Xanthomonas phaseoli | 1.8 | 1.7 |

| | | |
|---|---|---|
| ATCC No. 9563 | | |
| *Streptococcus facealis* | 2.4 | 2.3 |
| Available on Request | | |
| *Streptococcus hominis* | 2.4 | 2.2 |
| Available on Request | | |
| *Corynebacterium diphtheriae* | 2.2 | 2.1 |
| ATCC No. 19409 | | |
| *Corynebacterium haemolyticum* | 2.1 | 2.0 |
| ATCC No. 9345 | | |
| *Escherichia coli* | Trace | Trace |
| ATCC No. 9637 | | |
| *Micrococcus lysodeikticus* | 1.7 | 1.5 |
| ATCC No. 4698 | | |
| *Micrococcus melitensis* | 1.7 | 1.5 |
| ATCC No. 19396 | | |
| *Micrococcus tetragena* | 1.7 | 1.5 |
| ATCC No. 10875 | | |
| *Diplococcus intracellularis* | 2.3 | 2.2 |
| Available on Request | | |
| *Diplococcus meningitidis* | 2.3 | 2.2 |
| Available on Request | | |
| *Diplococcus pneumoniae* | 2.3 | 2.2 |
| ATCC No. 6303 | | |

Those skilled in the art will recognize that the scope of this invention should not be limited to the particular species of the above genera. For instance, the noted activity of alloxantin compounds against *Xanthomonas phaseoli* suggests that the compound will also prove to be of value against such other *Xanthomonas* species as *Xanthomonas transluscens*, *Xanthomonas juglandis*, *Xanthomonas vesicatoria*, *Xanthomonas barbareae*, *Xanthomonas pelargonii*, *Xanthomonas alfalfae*, *Xanthomonas vasculorum*, et cetera. Similar possibilities exist for species of the other genera whose activities were shown to be arrested by these alloxantin compounds.

Although the precise mode of action whereby alloxantin compounds inhibit the growth of such bacteria is not completely understood, it is generally believed that the alloxantin compounds of this invention may serve as chemical antagonists; that is, as chemicals which compete with enzymes essential to the development of such bacteria. Since enzymes perform their catalytic function by virtue of their affinity for their natural substrate, any compound resembling a substrate in its chemically critical aspect may also have an affinity for the enzymes. If this affinity is great enough, the analog will displace the normal substrate from the enzyme and will prevent the growth reaction from taking place. It is believed that alloxantin and alloxantin dihydrate have a chemical affinity for an essential site on one enzyme necessary for bacterial growth and life.

The above data indicates that alloxantin compounds can also be used to protect plant life from a wide variety of diseases caused by bacteria. By plant life, it is meant organisms such as living plants, tubers, seeds, bushes, vegetables, and trees, and the like. For example, various Xanthomonas species are known to cause diseases of tomatoes, sugar cane, rice, sugar beets, cotton, walnuts, wheat, rye, barley and beans. Some of the more noteworthy species are *Xanthomonas vesicatoria* (Bacterial Leaf Spot of Tomatoes), *Xanthomonas phaseoli* (Common Bacterial Blight of Bean), *Xanthomonas vasculorum* (Gumming Disease of Sugar Cane), and *Xanthomonas malvacearum* (Bacterial Blight of Cotton).

Laboratory tests have also shown that alloxantin compounds can be used to protect plant life from diseases caused by fungi such as Fusarium, Alternaria and Aspergillus. This is of commercial significance since many fungi such as those of Fusarium cause rotting diseases of corn, sweet potato and tomato. Alloxantin compounds have proved to be particularly effective in reducing losses due to Fusarium Wilt of Tomatoes. The effectiveness of alloxantin compounds against this particular disease was established by the following test procedures and results:

Tomato seedlings, Bonny Best variety, in 7 to 8-leaf growth stage, mounted on compound turntable, were sprayed at 30 pounds pressure with alloxantin compounds at the concentrations indicated below. After drying, the treated plants were removed to greenhouses and maintained undisturbed for 4 days. The samples were prepared for spraying by dissolving alloxantin in suitable solvents (acetone, methyl alcohol, ethyl alcohol or other) and diluting to desired concentration with deionized water containing wetting and dispersing agents. Four days after treatment, intact plants with undisturbed root-soil balls were removed from their containers and root-dip inoculated by immersion of root-soil balls in a Fusarium Wilt of Tomatoe spore suspension and returned to their containers. The inoculated plants were then returned to the greenhouse and observed for disease development.

Disease symptoms appeared in the untreated controls approximately three weeks after inoculation. Disease severity was determined by a disease index rating in untreated controls based on a zero (no disease symptoms) to 4 (equivalent to 100 percent disease) scale. All units of these tests included a minimum of three replicates and the effectiveness of any given treatment was expressed as the average (from the 0 to 4 scale) of disease ratings in the three replicates.

The following results were achieved against Fusarium Wilt of Tomatoes:

| Compound: | |
|---|---|
| | Aqueous alloxantin solution |
| Activity: | Foliar fungicide vs. Fusarium Wilt of Tomatoes |
| % Inhibition at 500 ppm: | 43% |
| % Inhibition at 1000 ppm: | 96% |
| Control: | Maneb |
| Control Concentration: | 100 ppm |

It should also be noted that this protection was achieved with very little damage to the general environment since alloxantin exhibits a high degree of biodegradability.

Those skilled in the art will recognize that the scope of the instant invention should not be limited to the bacteria and fungi, indicated in the above examples. For instance, it should be recognized that other protectant, systemic, and eradicant procedures may provide detection of other biological activities. Pathogens representative of Phycomycetes, Ascomycetes, Basidiomycetes, and the *Fungi Imperfecti* may provide indices of other fungicidal activity. Furthermore, other appropriate host plants may establish other plant tolerance data. Additional pathogens and appropriate host plants may well afford additional opportunities to further define the degree and spectrum of the activity disclosed in this invention. Since no firm rules of procedure can be laid down for the sequence of such evaluations or for the choice of pathogens, the efficacy of alloxantin should be considered on the basis of its demonstrated performance in such primary evaluations and then progressively judged in subsequent studies. A wide range of pathogens, respresentative of economically important diseases, can be used to help define the spectra of activity and to assure high degrees of success under field conditions. Examples of other disease organisms, crops, and reference standards which may be used in such evaluations are:

| Disease | Disease Organism | Reference Compound |
|---|---|---|
| Powdery mildew of cucumbers | Erysiphe cichoracearum | Maneb, Karathane |
| Leaf rust of wheat | Puccinia rubigo-vera | Maneb, Karathane |
| Leaf rust of wheat | Puccinia rubigo-vera | Plantvax |
| Bacterial leaf spot of tomatoes | Xanthomonas vesicatoria | Streptomycin |
| Rice blast disease | Piricularia oryzae | Blasticidin |
| Downy mildew of Sugar beet | Peronospora schactii | Karathane |
| Downy mildew of lima bean | Phytophthora phaseoli | Karathane |
| Bean rust | Uromyces phaseoli var. typica | Maneb |
| Powdery mildew of wheat | Erysiphe graminis | Karathane |
| Powdery mildew of apple | Podosphaera leucotricha | Karathane |
| Powdery mildew of roses | Sphaerotheca pannosa var. rosae | Karathane |
| Powdery mildew of cantalope | Erysiphe cichoracearum | Karathane |
| Leaf spot of wheat | Helminthosporium sativum | Maneb |
| Early blight of Tomato | Alternaria solani | Maneb |
| Rice blast disease | Piricularia oryzae | Blastocidin |
| Cercospora leaf Spot of sugar beets | Cercospora beticola | Maneb |
| Septoria leaf spot of celery | apii-graveol-entis | Maneb |
| Apple Scab | Venturia inaequalis | Cyprex |
| Common bacterial blight of bean | Xanthomonas phaseoli | Streptomycin |

NOTE: Wherever possible, the applicants recommend the use of "in vivo" procedures to test the alloxantin compositions of this invention in order to demonstrate their efficacy under more realistic conditions. However, not all pathogens lend themselves to such techniques. In order to provide additional spectrum definitions, the following fruit-rotting, storage decay, and bacterial pathogens may be tested by "in vitro" methods:

| | | |
|---|---|---|
| Brown rot of stone fruits | Sclerotinia fructicola | Captan |
| Grey mold on fruit and vegetables | Botrytis cinerea | Maneb |
| Rhizopus fruit and vegetable rot | Rhizopus nigricans | Maneb |
| Citrus blue mold | Penicillium italicum | Karathane |
| Citrus green mold | Penicillium digitatum | Maneb |
| Blue mold of apple | Penicillium expansum | Maneb |
| Bacterial disease on many fruit crops | Pseudomonas syringae | Captan |
| Bacterial soft rot | Erwinia caratovora | Captan |

Another important advantage of alloxantin fungicides particularly in their agricultural applications, is that they can be made up in solid or liquid formulations. Examples of solid formulations are dust, wetable powders, granules, and pellets. As a dust, alloxantin compounds may be dispersed in powdered solid carriers such as talc, soaps, soapstone, attapulgus clay, as well as other finely divided solids known to the dusting art. When formulated as wetable powders, the active component may be employed in conjunction with interfillers which may be of the clay type carrier or non-clay type, in conjunction with various combinations of wetting agents and emulsifiers which permit the adaptation of the concentration as a free flowing powder for dispersion in the field.

Each of these carriers may contain one or more of the specified alloxantin compounds or unresolved mixtures of the alloxantin compounds of this invention along with other carriers or extenders which are ordinarily non-reacting or inert substances such as sand, clays, talc, sawdust, alkaline earth carbonates, oxides, phosphates, and the like, as well as diatomacious earth, micas, or other suitable materials. When liquid formulations are desirable, liquid extenders, dilutants or carriers of a non-reactive nature may be utilized. Examples of such materials are alcohol, ketones, glycols, aromatic hydrocarbons, petroleum fractions such as octane and various other distillates.

Where it is desired to use the aforementioned wetable powders or liquid formulations, either emulsified, dispersed, or suspended in water or other fluids, one or more of the class of materials herein referred to as adjuvants can also be incorporated into the powder, dust, liquid formulation. These adjuvants comprise surface active agents, detergents, wetable agents, stabilizers, dispersing agents, suspending agents, emulsifying agents, spreaders, stickers and conditioning agents generally. To their modifying characteristics these adjuvants may facilitate handling and application and infrequently enhance or potentiate the alloxantin compositions of this invention in their inhibitory activity by mechanisms which are not well understood. A satisfactory but not exhaustive list of these adjuvants appears in "Soap Chemical Specialities," Volume 31, No. 7, Page 61; No. 8, Pages 48–61; No. 9, Pages 52–67; and No. 10, Pages 38–67 (1955). See also Bulletin No. 607 of the Bureau of Entomology and Plant Quarantine of the United States Department of Agriculture.

An additional advantage of such alloxantin compositions is their compatibility with a variety of other biocidal and fungicidal materials. For example, it may be convenient to combine one or more alloxantin compositions with one or more adjuvants and carriers with other pesticides, biocides, and fungicides of various structures. For example, the alloxantin fungicidal inhibitors may be combined with insecticidal materials such as chlordane, benzene hexachlorides, DDT, DDD, the insecticidal carbamates, polychlorinated terpenes, parathions, methoxychlor, insecticidal phosphates, phosphorothioates, phosphorodithioates or with fungicides such as sulphur, quinones, dodecylgaunidine, and metal dimethyldithiocarbamates.

There may be many other considerations which will make some methods of dispersion more favored than others. These considerations may include the type of organisms on which the compound is to be administered, the degree of activity, the degree of inhibition toward the organism, and side effects. Also to be considered, is the cost of production and the characteristic solubility of the alloxantin compounds in the carrier material.

The effectiveness of the alloxantin compounds as a herbicide has also been well established. This activity was established by the following test. The appropriate crop plants and herb species were seeded by growth-time requirement schedules in individual disposable containers, watered as required, and maintained in greenhouses. When the crop plants and herbs reached suitable growth development, generally when the first true leaf stage appeared, the appropriate plants and herbs were selected on the basis of their uniformity of growth and development. One container of each crop and herb, averaging six corn to 50 herb plants per individual container was then placed on carrying trays for treatment. Generally six crop and six herb containers were used in each evaluation.

The alloxantin compounds were dissolved in suitable organic solvents and diluted in water containing wetting and emulsifying agents. One carrying tray each of the preemergence (six crops and six herbs) and postemergence (six crops and six herbs) containers was mounted on a conveyor belt having a 1.5 m.p.h. linear speed. The trays were designed to trip a microswitch which in turn activated a solenoid valve and released the alloxantin treatment. Treatments are dispersed as sprays at the above indicated rates calculated in pounds per acre at 30 p.s.i. pressure. The spray unit was equipped with a Teejet 8003E or similar nozzle tip. Immediately following spray application, preemergence and postemergence treatments were removed to the greenhouse and held for observation. Two-four-D was used as a reference standard.

Preemergence and postemergence treatments were observed daily for interim response, with final observations being made fourteen days after treatment. Any treatments which induced questionable response were held beyond the fourteen-day observation period until such responses could be confirmed. Observations included all abnormal physiological responses of stem bending, petiole curvature, epinasty, hyponasty, retardation, stimulation, root development, necrosis and related growth regulant characteristics. The injury ratings were based on a scale of zero (no injury) to 10 (complete kill). The following results were noted:

| Compound | Activity | % Inhibition at 5 pounds/acre | % Inhibition at 10 pounds/acre |
|---|---|---|---|
| Aqueous alloxantin in solution | Herbicide | | |
| | vs. mustard | 10% | 30% |
| | vs. buckwheat | 50% | 50% |
| | vs. sugar beet | 50% | 50% |

To further illustrate the workings of the anti-bacterial and antifungal aspects of this invention, the following other examples are submitted:

EXAMPLE I - Determining Antifungal Activity of Alloxantin Compounds Against Test Organisms.

Experimental

The following viable test fungi were treated as described below:
Fusarium oxysporum
Fusarium roseum
Rhizopus nigricans
Rhizopus stolonifer
Aspergillus niger
Alternaria solani One loopful of each of the above viable fungi cultures, spores, and mycelia was transferred from an agar slant to an 80 ml. portion of the nutrient broth composed of oatmeal agar and deionized water. The 80 ml. portion of the fungi and broth was placed in a sterile shake flask (300 ml.) and the flask was placed on a rotary shaker for 96 to 120 hours at room temperature. At the end of this incubation time period, 10 ml. of the liquid was homogenized and placed into another sterile shake flask (300 ml.) containing 90 ml. of the above nutrient broth and 60 p.p.m. of alloxantin. The flasks were placed on a rotary shaker operating at 240 r.p.m. at room temperature from 3 to 9 days. After this second incubation time, the flasks are taken off and examined for visible fungal growth and mycelial weights are then determined. Untreated controls are used as the basis of comparison.

RESULTS

The alloxantin compounds of this invention imparted a high degree of inhibition of fungal growth at 60 p.p.m.

EXAMPLE II - Formulation of a Paint having Anti-Mildew Properties.

The following ingredients are blended and ground together in the indicated proportions in a ball mill.

| Ingredient | Pounds per 1000 Gallons |
|---|---|
| Gum Rosin, Grade W.W. | 380 |
| Blown fish oil | 238 |
| Zinc stearate | 20 |
| Alloxantin | 20 |
| Zinc oxide | 160 |
| Magnesium silicate | 60 |
| Solvent naphtha | 222* |

*Volume adjusted to 1000 gallons by the addition of naphtha.

EXAMPLE III - Anti-Mildew Paint Formulation.

The following ingredients are blended together in the indicated proportions in a ball mill.

| Ingredient | POunds per 1000 Gallons |
|---|---|
| Rosin | 300 |
| Coal tar | 100 |
| Talc | 100 |
| Pine Oil | 50 |
| Alloxantin | 20 |
| High flash naphtha and Mineral spirits | 200* |

*Volume adjusted to 1000 gallons by the addition of high flash naphtha and mineral spirits.

EXAMPLE IV - Preparation of a Vinyl Coating Resistant to Mildew Deterioration.

A vinyl coating is prepared using a commercially available preparation without a fungal growth inhibitor.

An identical vinyl coating is prepared except that 2 percent by weight of alloxantin or alloxantin dihydrate is incorporated into the coating formulation.

Two sets of components such as asbestos tubing, silk-wrapped transformers and rayon-wrapped solenoids were obtained. One set was sprayed with the vinyl coating containing inhibitor, the other with the identical coating without inhibitor.

EXAMPLE V - Preparation of Plasticizers Resistant to Mildew.

A commercial thermoplastic monomer was divided into portions which were treated as follows:

Portion 1: To the first portion was added 2 percent by weight of alloxantin or alloxantin dihydrate and 10 percent by weight of dimethylnaphthalate as plasticizer. The monomer is polymerized and molded into 3-inch diameter discs, ¼ inch in thickness prior to testing.

Portion 2: To this portion was added 2 percent by weight of alloxantin or alloxantin dihydrate and 10 percent by weight of butyl isodecylphthalate as plasticizer. The monomer is polymerized and molded as above.

Portion 3: This portion was the untreated control of Portion 1 containing no fungal inhibitor but 10 percent by weight of dimethylphthalate as plasticizer. Again, the polymerization and molding are identical.

Portion 4: This portion was the untreated control of Portion 2 containing no fungal inhibitor but 10 percent by weight of butyl isodecylphthalate as plasticizer. The polymerization and molding are as described above.

The two plasticizers are chosen on the basis of their known susceptibility to Fusarium attack under high humidity and temperature conditions.

EXAMPLE VI - Evaluation of the Paint Formulations, Vinyl Coatings, and Plasticizers for Mildew and Fungal Resistance.

A. The paint formulations from Examples II and III are painted on steel test panels which were allowed to dry and then placed in an air-tight high temperature and humidity chamber maintained at 80° F. and 95 percent humidity to simulate tropical temperature and humidity conditions. At the same time, steel test panels painted with untreated control formulations were placed in the same chamber.

B. The vinyl coated articles of Example IV were placed in the identical heat and humidity chamber with the control articles.

C. The discs of Example V made as previously described are placed in a third high temperature and humidity chamber similar to the two described above.

RESULTS

A. After a 1-month test period, the control paint panels were found to be coated with various fungi including Fusarium, Penicillium, and Aspergillus species and were discolored. The treated painted panels were unaffected.

B. After a month's exposure the vinyl coated articles treated with inhibitor were only slightly attacked by rot while the articles coated with vinyl without inhibitor were well rotted.

C. After a month of testing the two untreated control discs are examined and are found to be blackened and mildew rotted. Isolates of Aspergillus, Fusarium, and unknown species of yeasts were prepared from the deteriorated discs. The two discs containing fungal inhibitors were not adversely affected.

EXAMPLE VII - Evaluation of Alloxantin Compositions as Mildew Retardant in Cotton.

Tests are run under conditions similar to those described in detail in Method 5762, "Mildew Resistance of Cloth; Soil Burial Method," of Federal Specification CCC-T-191, "Textile Test Methods," were used, that is standard blue-line cotton duck fabrics (3" X 3") were impregnated with 2 percent solutions of alloxantin compositions calculated on the dry weight of the fabric. The fabric was cut in three 1" X 3" strips which were raveled and buried vertically. At the same time, an identical piece of 3" X 3" cotton duck fabric untreated for control purposes was buried using the same techniques and location. At the end of 5 days' burial, the two groups of buried cotton were removed and tested for loss of breaking strength as compared to unburied controls. Test results indicate that cloth treated with alloxantin compounds require substantially more force to break than the untreated controls.

Having thus disclosed our invention, we claim:

1. A method of killing or inhibiting the growth of microorganisms selected from the group consisting of fungi, and Gram positive bacteria which comprises applying to said microorganisms an effective bactericidal, bacteriostatic, or fungicidal amount of an alloxantin compound wherein said alloxantin compound is selected from the group consisting of alloxantin, alloxantin dihydrate, and mixtures thereof.

2. The method of claim 1 wherein the bactericidal, bacteriostatic, or fungicidal compound is alloxantin.

3. The method of claim 1 wherein the bactericidal, bacteriostatic, or fungicidal compound is alloxantin dihydrate.

4. The method according to claim 1 wherein the Gram positive bacteria are selected from the group consisting of Staphylococci, Corynebacter, Micrococci, Diplococci, Streptococci, and Xanthomonas.

5. The method according to claim 4 wherein the Staphylococci is Staphylococcus aureus.

6. The method according to claim 4 wherein the Corynebacter are selected from the group consisting of Corynebacterium diphtheriae and Corynebacterium haemolylicum.

7. The method according to claim 4 wherein the Micrococci are selected from the group consisting of *Micrococcus tetragena*, *Micrococcus melitensis*, and *Micrococcus lysodeikticus*.

8. The method according to claim 4 wherein the Diplococci are selected from the group consisting of *Diplococcus intracellularis*, *Diplococcus pneumoniae* and *Diplococcus meningtidis*.

9. The method according to claim 4 wherein the Xanthomonas is *Xanthomonas phaseoli*.

10. The method according to claim 4 wherein the Streptococci is selected from the group consisting of *Streptococcus faecalis* and *Streptococcus homininis*.

11. The method of claim 1 wherein the fungi is selected from the group consisting of Fusarium, Penicillium, and Aspergillus.

12. A method of killing or inhibiting the growth of microorganisms selected from the group consisting of fungi and Gram positive bacteria on plants which comprises applying to said plants an effective bactericidal, bacteriostatic or fungicidal amount of a compound selected from the group consisting of alloxantin, alloxantin dihydrate and mixtures thereof.

* * * * *